Patented Mar. 25, 1941

2,236,408

UNITED STATES PATENT OFFICE 2,236,408

RESILIENT MOUNTING FOR THE DRIVING UNIT IN AUTOMOBILES

Miloš Klavík, Prague, Czechoslovakia

Application February 3, 1939, Serial No. 254,463
In Czechoslovakia February 4, 1938

2 Claims. (Cl. 180—64)

This invention relates to a resilient mounting for the driving unit in automobiles, preferably vehicles with motor at the rear.

In automobiles, the driving unit is sometimes mounted in a V-shaped end fork of the central chassis member. This overhung mounting of the relatively long driving unit has, however, the disadvantage that the motor readily commences to vibrate or oscillate and that the bearing member is not very stiff at the forked end.

According to this invention, this mounting of the driving unit is improved by stiffening the fork arms at the end by means of a transverse member possessing a circular bearing opening through which a portion of the driving unit passes. The circular opening is lined entirely or partly with resilient material on which the portion of the unit passing through the opening rests, the inner end of said unit, that is to say, normally the end of the gear box, being likewise resiliently secured at the forking point of the central bearing member so low that the axis of vibration of the motor passes through the centre of gravity of the entire unit or at least in the immediate vicinity of said centre.

A constructional example of the device is shown diagrammatically in the accompanying drawing, wherein—

Figures 1, 2, 3, 4:
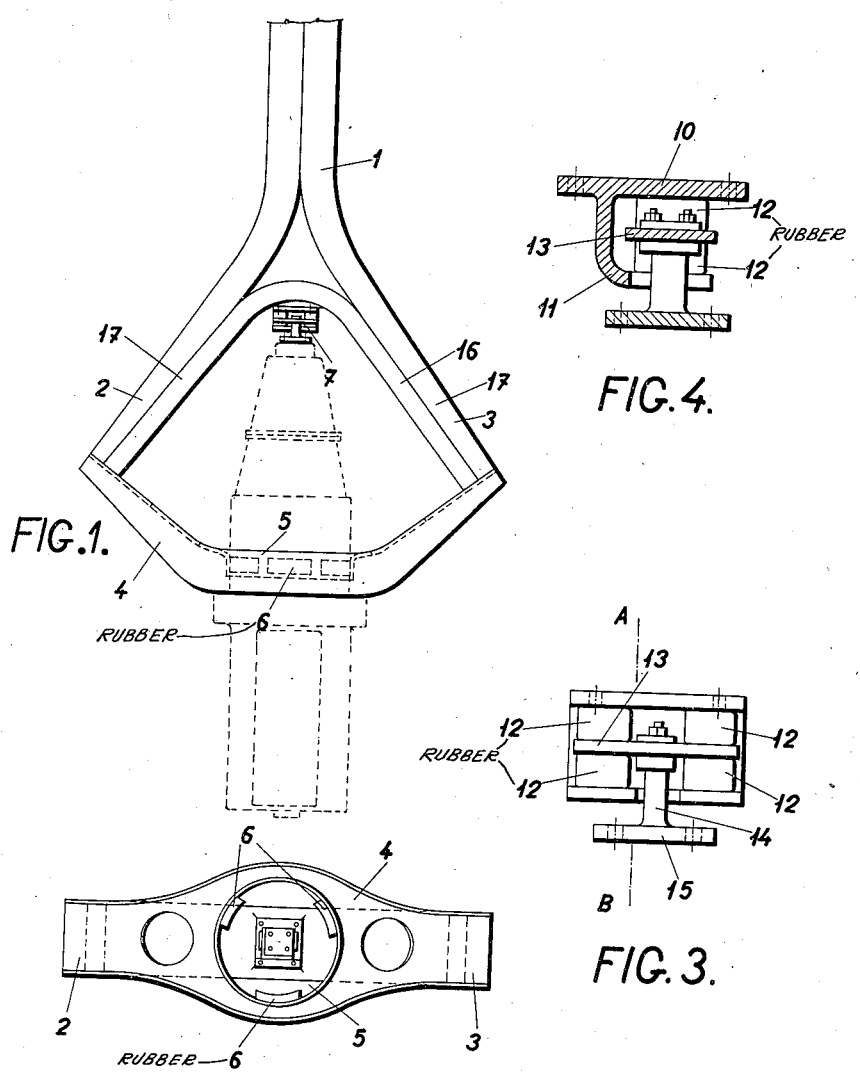
Figure 1 is a plan view of the bearing-member end constructed for mounting the driving unit of the automobile.
Figure 2 is an elevation of the bearing member end.
Figure 3 shows on a larger scale a detail of the mounting of the end of the unit in the forking.
Figure 4 shows a cross-section on the line A—B in Figure 3.

The central member 1 of the chassis is forked at its rearward end into arms 2 and 3, the ends of which are connected together by a pressed transverse bearing member 4, having a central circular opening 5 lined partly or entirely with resilient material, for example rubber 6 or the like. At the crutch or forking point of the end of the central member, a second resiliently supported bearing 7, for example with rubber, is provided for the suspension of the end of the driving unit. After assemblage, therefore, the driving unit rests resiliently at one end in the opening of the transverse bearing member 4 and at the other end on the end bearing 7, so that it is completely spring-mounted on the frame of the chassis. The bearing 7 comprises a fixed support 10 having a forked L-shaped projection 11 slotted to permit the shank 14 on a coupling plate 15 to pass. The shank 14 is secured to a plate 13 held between resilient members 12 (rubber blocks for example) as shown in detail in Figs. 3 and 4.

Thus, there is obtained not only a perfectly resilient mounting of the driving unit but also a firm and in addition very light stiffening of the forked end of the central chassis member.

I claim:

1. A resilient mounting for the driving unit of automobiles having a forked central chassis member, comprising a transverse member connecting the ends of the fork, a bearing for the driving unit in the transverse member, resilient material within the bearing on a portion of which resilient material the driving unit lies, a second bearing for the inner end of the driving unit placed in the crotch of the forked chassis member and resilient material supporting the second bearing.

2. A resilient mounting for the driving unit of automobiles having a forked central chassis member, comprising a transverse member connecting the ends of the fork, said transverse member having a bearing aperture to receive the transmission case of a driving unit, resilient material in said aperture, a second bearing for the inner end of the unit which second bearing is located in the crotch of the fork, the axes of said bearing aperture and that of said second bearing being in alignment and approximately in the plane of the frame.

MILOŠ KLAVÍK.